United States Patent [19]

Burness et al.

[11] 4,128,538
[45] Dec. 5, 1978

[54] CROSSLINKING POLYMERIC DYE MORDANT COMPOSITION REACTION PRODUCT OF BISALKANE OR BISARENE SULFONATE AND VINYL POLYMER

[75] Inventors: Arnold M. Burness; Hans G. Ling, both of Rochester; Glen M. Doppen, Webster, all of N.Y.

[73] Assignee: Eastman Kodak Company, Rochester, N.Y.

[21] Appl. No.: 508,771

[22] Filed: Sep. 24, 1974

Related U.S. Application Data

[62] Division of Ser. No. 412,992, Nov. 5, 1973, Pat. No. 3,859,096.

[51] Int. Cl.$^2$ .............................................. C08G 69/48
[52] U.S. Cl. ................................. 260/884; 260/17 R; 526/23; 526/49; 260/885; 506/40
[58] Field of Search .................. 260/78 UA; 96/84 A

[56] References Cited

U.S. PATENT DOCUMENTS

| 3,625,694 | 12/1971 | Cohen et al. ......................... 96/84 A |
| 3,689,272 | 9/1972 | Schwan et al. ............................ 96/3 |
| 3,709,690 | 1/1973 | Cohen et al. ............................ 96/67 |

Primary Examiner—Harold D. Anderson
Attorney, Agent, or Firm—Arthur H. Rosenstein

[57] ABSTRACT

A dye mordant composition comprises the reaction product of (1) a vinyl copolymer derived from ethylenically unsaturated monomers comprising first and second repeating units wherein at least one third of the units are first repeating units represented by the formula:

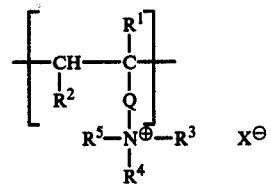

wherein $R^1$ and $R^2$ are hydrogen or alkyl and $R^2$ may be a group containing at least one aromatic nucleus; Q is a divalent radical, $R^3$, $R^4$ and $R^5$ are alkyl or aryl and $R^3$ and $R^4$ along with the nitrogen atom and Q may form a quaternized heterocyclic ring, and $X^\ominus$ is an anion and the second repeating units are free of acidic carboxyl groups; and (2) a vinyl polymer crosslinking agent for the copolymer comprising a bisalkane sulfonate or bisarene sulfonate. These compositions are useful as dye mordants in photographic elements.

13 Claims, No Drawings

CROSSLINKING POLYMERIC DYE MORDANT COMPOSITION REACTION PRODUCT OF BISALKANE OR BISARENE SULFONATE AND VINYL POLYMER

This is a division of application Ser. No. 412,992, filed Nov. 5, 1973, now U.S. Pat. No. 3,859,096, issued Jan. 7, 1975.

The present invention relates to the modification of polymeric dye mordants adopted for use in photographic products and to photographic processes using such products.

It is known in the photographic art to use various polymeric materials as mordants in imbibition printing and in color photographic products to prevent the migration of dyes. Among the mordants employed are polymers containing acid salts such as are disclosed in U.S. Pat. Nos. 3,048,487 and 3,184,309 both to Hyman L. Cohen and Louis M. Minsk. Mordants of these types exhibit good dye retention under certain conditions. Frequently, the mordants are stored in a blank which is contacted with the matrix. However, these mordants can diffuse out of the blanks in which they are used and into the matrix when contacted therewith. The result is that as repeated dye transfers are made from a given matrix more mordant diffuses into the matrix, combines with some of the dye and is held there.

The mordant-dye complex formed in the dye storage matrix increases with successive transfers, finally reaching a point where it interferes with the transfer process so that satisfactory images cannot be made. It thus becomes necessary to subject the matrix to a special treatment between transfers thereby increasing the cost of the process. This special treatment, in addition to its cost, very often has a deleterious effect upon image quality-definition, for example. Thus, it is desirable to provide a mordant which is substantially free of matrix poisoning.

Among various polymers suggested as dye mordants are those formed by quaternizing a polymer containing tertiary nitrogen atoms with an alkylating or aralkylating agent, such as those described in Cohen et al U.S. Pat. Nos. 3,625,694 and 3,709,690, issued Dec. 7, 1971 and Jan. 9, 1973, respectively.

The crosslinking of various hydrophilic colloids and binders in systems using dye mordants has been described in U.S. Pat. No. 3,309,376 to Haas et al, issued Mar. 14, 1967, U.S. Pat. No. 3,316,089 to Haas et al, issued Apr. 25, 1967, U.S. Pat. No. 3,427,158 to Carlson et al, issued Feb. 11, 1969 and U.S. Pat. No. 3,689,272 to Schwan et al, issued Sept. 5, 1972.

U.S. Pat. No. 2,816,125, issued Dec. 6, 1955, to Allen et al and U.S. Pat. No. 2,726,162, issued Dec. 10, 1957, to Allen et al describe various crosslinking materials containing sulfonoxy groups.

Polymeric mordants show considerable differences in their properties, due to differences in molecular weight and degree of quaternization. Treatment of the mordant with a crosslinking agent compensates for these variations. Further, the gloss of prints made in a diffusion transfer process using receiver sheets containing crosslinked mordants is improved.

Therefore, it is an object of this invention to provide new mordant compositions.

It is another object of this invention to provide new compositions containing dye mordant polymers and bissulfonates as crosslinking agents for use in photography.

It is still another object of this invention to provide new photographic elements containing mordants which have reduced variation in properties.

It is still another object of this invention to provide photographic elements having mordanted images of increased densities.

It is still another object of this invention to provide a new light-filtering layer coated with a composition comprising a hydrophilic colloid and a dye mordant composition.

It is a further object of this invention to provide a photographic element comprising a support, a silver halide layer and at least one layer comprising the composition of this invention.

Still another object of this invention is to provide an integral negative receiver photographic element comprising a support having a layer containing the crosslinked polymeric mordant of this invention and at least one photosensitive silver halide emulsion layer of which has contiguous thereto a dye image-providing material.

These and other objects are accomplished in one aspect using a dye mordant composition comprising a copolymer derived from ethylenically unsaturated monomers having one or more repeating units, said copolymer having at least one-third of the repeating units having the formula:

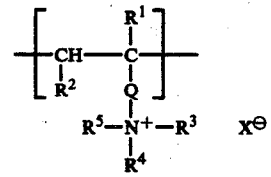

wherein $R^1$ and $R^2$ are hydrogen or lower alkyl and $R^2$ can additionally be a group containing at least one aromatic nucleus; Q is a divalent radical, $R^3$, $R^4$ and $R^5$ are lower alkyl or aryl groups or $R^3$ and $R^4$ and the nitrogen atom to which they are attached, can together with Q, represent the atoms and bonds necessary to form a quaternized nitrogen-containing heterocyclic ring; and $X^\ominus$ is an anion; and wherein said copolymer is substantially free of acidic carboxy groups and a crosslinking agent for the copolymer comprising a bisalkane or bisarene sulfonate having the formula:

$$R-SO_3-CH_2-Y-CH_2O-SO_2-R$$

wherein R is alkyl or aryl and Y is an unsaturated divalent radical.

The preferred polymers to be crosslinked according to this invention are those described in U.S. Pat. No. 3,709,690 to Cohen et al and comprise units of the following formula in copolymerized relationship with units of at least one other ethylenically unsaturated monomer:

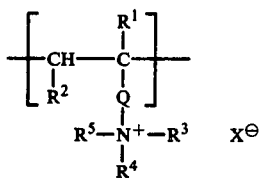

wherein $R^1$ and $R^2$ can each be hydrogen atoms, lower alkyl of 1 to 6 carbon atoms, such as methyl, ethyl, propyl, n-butyl, t-butyl, and the like, and $R^2$ can additionally be a group containing at least one aromatic nucleus, including substituted aryl, e.g., phenyl, tolyl, naphthyl, etc; Q can be a divalent alkylene such as ethylene, trimethylene, tetramethylene or the like; divalent arylene such as phenylene, biphenylene, naphthylene and the like; divalent aralkylene such as benzylidene, phenethylidene and the like; or divalent arylenealkylene radical such as

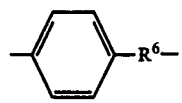

or the like or radicals including:

where —$R^6$— is an alkylene radical typically having 1 to 4 carbon atoms such as methylene, ethylene, propylene or butylene or $R^2$ can be taken together with Q to form a

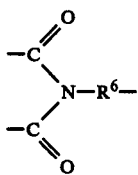

group; $R^3$ and $R^4$ and $R^5$ are lower alkyl including substituted alkyl, containing from 1 to 6 carbon atoms such as methyl, ethyl, hexyl, benzyl, cyanoalkyl, alkoxyalkyl, carbalkoxyalkyl, carbamoylalkyl, etc, wherein the alkyl radicals contain from 1 to 6 carbon atoms, aryl, including the substituted aryl, e.g., phenyl, naphthyl, tolyl, etc, or $R^3$ and $R^4$ and the nitrogen atom to which they are attached can be taken with Q to represent the atoms and covalent bonds necessary to form a quaternized nitrogen-containing heterocyclic ring such as a 2-pyridinium

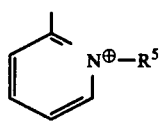

or a 3-pyridinium

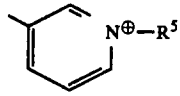

ps or a 4-pyridinium

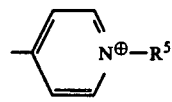

ring; and $X^\ominus$ is an anion, i.e., a monovalent negative, salt-forming, ionic radical or atom such as a halide, alkyl sulfate, alkane or arene sulfonate (for example, a p-toluenesulfonate), dialkyl phosphate, or similar anionic moiety.

The copolymers of this invention comprise copolymers of the above materials with other ethylenically unsaturated monomers wherein at least one-third of said polymer is comprised of units represented by the formula represented above. It is understood in the above formula that Q cannot be linked simultaneously with $R^2$, $R^3$ and $R^4$ and that the copolymer can be substantially free of acidic carboxyl groups.

Typical ethylenically unsaturated monomers which can be used to form ethenic interpolymers including interpolymers containing 2, 3 or more recurring units and the like according to this invention include ethylene, propylene, 1-butene, isobutene, 2-methylpentene, 2-methylbutene, 1,1,4,4-tetramethylbutadiene, styrene, alphamethylstyrene; monoethylenically unsaturated esters of aliphatic acids such as vinyl acetate, isopropenyl acetate, allyl acetate, etc; esters of ethylenically unsaturated mono- or dicarboxylic acids such as methyl acrylate, methyl methacrylate, ethyl acrylate, diethyl methylenemalonate, etc; monoethylenically unsaturated compounds such as acrylonitrile, allyl cyanide, and dienes such as butadiene and isoprene. A preferred class of ethylenically unsaturated monomers which may be used to form the ethenic polymers of this invention includes the lower 1-alkenes having from 1 to 6 carbon atoms, styrene, and tetramethylbutadiene. The combination of vinyl polymers and ethylenically unsaturated monomers should be chosen so as to assure that the positive salt-forming moiety or radical of the resulting copolymer comprises at least two aromatic nuclei for each quaternary nitrogen atom in said polymer.

The polymers of the invention are water or methanol soluble polymers having a hydrocarbon backbone and are composed of recurring units supplying quaternized nitrogen atoms and having at least two aromatic nuclei, such as aryl groups, e.g., phenyl, pyridinium, etc, per quaternized nitrogen atom. The polymers should be substantially free of carboxyl groups, for the presence of carboxyl groups in the interpolymers interferes with effective dye mordanting.

It is understood that the aromatic nuclei can be located on any unit of the polymeric chain as long as there are two aromatic nuclei for each quaternized nitrogen atom in said polymer. In one preferred embodiment, at least one of $R^3$, $R^4$ or $R^5$ in the above formula contains an aromatic nucleus. The aromatic nuclei contain at least 6 carbon atoms, often 6–12 carbon atoms, and can be represented by the structure:

$$A-(CH_2)_n-$$

wherein A includes an aromatic nucleus which can be substituted, if desired, with non-interfering groups such as alkyl and nitro groups and n is an integer of 0 to 4. The aromatic nuclei of this invention contain at least one aryl group. Typical groups are phenyl, benzyl, naphthyl, phenethyl, phenylpropyl, naphthylmethyl, naphthylpropyl, biphenylyl, alkyl-substituted phenyls, and the like. In general, at least about one-third of the recurring units in the polymers which are good dye mordants contain quaternary nitrogen atoms.

The polymeric mordants of the invention are generally prepared by quaternizing an intermediate polymer having tertiary nitrogen atoms with an alkylating or aralkylating agent. The method of preparation of the intermediate polymer (hereinafter interpolymer) containing the tertiary nitrogen atoms for subsequent quaternization can be accomplished in a variety of ways. Any of the methods known in the art, such as mass, solution, or bead polymerization, as well as condensation polymerization, can be used to prepare the intermediate polymers, and polymerization catalysts known to the art, such as ultraviolet light, peroxides, azo compounds (e.g., azobisisobutyronitrile), etc, can be employed.

It is often advantageous to prepare the intermediate polymers as derived polymers such as, for example, the styrene-maleimide polymers described in Cohen and Minsk U.S. Pat. No. 3,048,487, which are made by the reaction of a maleic anhydride interpolymer and a dialkylaminoalkylamine. Typical suitable intermediate polymers include copoly[styrene-N-(3-dimethylaminopropyl)acrylamide], copoly[styrene-N-(3-dimethylaminopropyl)-maleimide], copoly(styrene-2-dimethylaminoethylmethacrylate), copoly(styrene-4-vinylpyridine), copoly[2-vinylnaphthalene-N-(3-dimethylaminopropyl)maleimide], copoly[4-vinylbiphenyl-N-(3-dimethylaminopropyl)maleimide], copoly{styrene-1,1,4,4-tetramethylbutadiene-1-[2-(N,N-diethylamino)ethyl]maleimide}, copoly[p-nitrostyrene-1-(N,N-dimethylaminomethyl)maleimide], copoly{o-methylstyrene-1-[3-(N,N-dibutylamino)propyl]-maleimide}, copoly{2,4-dichlorostyrene-N-[4-(N,N-dimethylamino)butyl]acrylamide}, copoly{4-methylstyrene-N-[2-(N',N'-diethylamino)ethyl]-methacrylamide}, copoly{styrene-N-[2-(N',N'-dimethylamino)-ethyl]acrylamide}, copoly{4-cyanostyrene-N-[2-(N',N'-dimethyl-amino)ethyl]acrylamide}, copoly{4-chlorostyrene-N-[2-(N',N'-dibenzylamino)ethyl]acrylamide}, copoly[vinylbenzoate-vinyl-α-(N,N-dimethylamino)acetate], copoly{benzylacrylate-1-[3-(N,N-dimethylamino)propyl]-maleimide}, copoly{phenylacrylate-N-[3-(N',N'-diethylamino)propyl]methacrylamide}, copoly{2-methyl-styrene-N-[2-(N',N'-diethylamino)ethyl]methacrylamide}, copoly-{styrene-1-[4-(N,N-dimethylamino)phenyl]maleimide}, copoly-{styrene-1-[4-(N,N-diethylamino)phenyl]maleimide}, copoly{4-nitrostyrene-1-[4-(N,N-diethylaminomethyl)-phenyl]maleimide}, copoly{styrene-1-[4-(N,N-dimethylaminomethyl)phenyl]maleimide}, copoly{styrene-1-[4-(N,N-dimethylaminomethyl) benzyl]maleimide}, and the like.

Generally, these intermediate polymers are addition copolymers comprising at least 33⅓ mole percent of tertiary amine-containing units and preferably at least 50 mole percent, the remainder of the units being derived from other ethylenically unsaturated monomers.

Quaternization of tertiary nitrogen-containing groups in the interpolymer of the invention may be effected by using an alkylating agent which can be represented by the structure $R^5X^-$ wherein $R^5$ is as defined above, and $X^-$ is an anion such as monoalkyl sulfate, sulfonate, dialkyl phosphate, halide, etc. Examples of suitable $R^5$ groups are methyl, ethyl, propyl, butyl, pentyl, and the like, benzyl, phenethyl, phenylpropyl, naphthylmethyl, naphthylpropyl, and the like. The quaternizing agent selected can depend, of course, on whether or not the nitrogen atom appended to the interpolymer chain already contains an aromatic nucleus attached thereto. The quaternization may be effected in a solvent such as water, acetone, benzene, dimethyl-formamide, dimethylsulfoxide, dimethylacetamide, or an alcohol such as methanol, ethanol, isopropanol, 2-ethoxyethanol (Cellosolve), and the like. Generally, the quaternization is carried out to quaternize at least 33⅓% and preferably at least 50% of tertiary nitrogen atoms. Temperatures from room temperature to 125° C. are generally used and if quaternization of only a part of the tertiary nitrogen atoms is desired, the amount of quaternizing agent may be reduced to correspond with the number of tertiary nitrogen atoms to be converted.

Some compounds which illustrate the polymeric mordants of the invention are the following where X is 0 to 66⅔ and Y is 100 minus X;

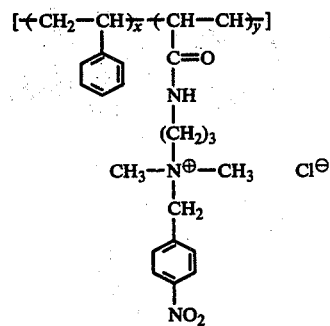

Copoly[styrene: N-(3-acrylamidopropyl)-N,N-dimethyl-N-(4-nitrobenzyl)ammonium chloride].

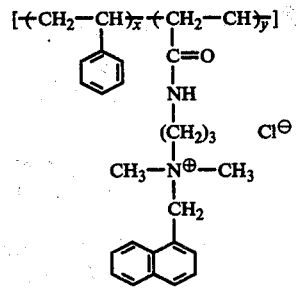

Copoly[styrene:
N-(3-acrylamidopropyl)-N,N-dimethyl-N-(1-naphthyl-methyl)ammonium chloride].

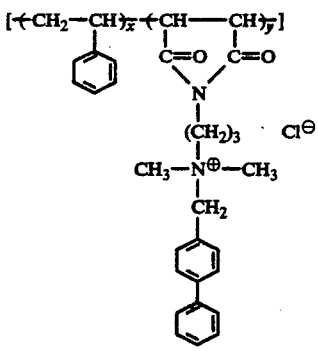

Copoly[styrene:
N-(3-maleimidopropyl)-N,N-dimethyl-N-(4-phenylbenzyl)ammonium chloride].

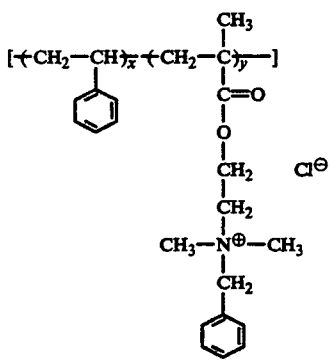

Copoly[styrene:
N-(2-methacryloyloxyethyl)-N,N-dimethyl-N-benzylammonium chloride].

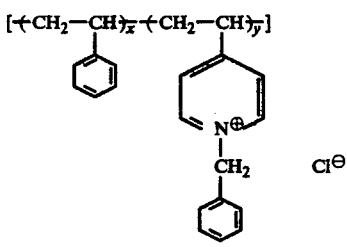

Copoly(styrene: 1-benzyl-4-vinylpyridinium chloride).

Other copolymers useful as mordants within the scope of this invention are illustrated by the following:

copoly[styrene-1,1,4,4-tetramethylbutadiene-N,N-diethyl-N-benzyl-N-(2-maleimidoethyl)ammonium bromide], copoly[styrene-1,1,4,4-tetramethylbutadiene-N,N-diethyl-N-benzyl-N-(2-maleimidoethyl)ammonium iodide], copoly[styrene-1,1,4,4-tetramethylbutadiene-N,N-diethyl-N-benzyl-N-(2-maleimidoethyl)ammonium p-toluenesulfonate], copoly[styrene-1,1,4,4-tetramethylbutadiene-N,N-diethyl-N-benzyl-N-(2-maleimidoethyl)ammonium acetate], copoly[styrene-1,1,4,4-tetramethylbutadiene-N,N-diethyl-N-benzyl-N-(2-maleimidoethyl)ammonium methanesulfonate], copoly[styrene-1,1,4,4-tetramethylbutadiene-N,N-diethyl-N-benzyl-N-(2-maleimidoethyl)ammonium chloride], copoly(p-nitrostyrene-N,N-dimethyl-N-naphthyl-methyl-N-maleimidomethylammonium chloride), copoly(p-nitrostyrene-N,N-dimethyl-N-naphthyl-methyl-N-maleimidomethylammonium bromide), copoly(p-nitrostyrene-N,N-dimethyl-N-naphthyl-methyl-N-maleimidomethylammonium iodide), copoly(p-nitrostyrene-N,N-dimethyl-N-naphthyl-methyl-N-maleimidomethylammonium p-toluenesulfonate), copoly(p-nitrostyrene-N,N-dimethyl-N-naphthyl-methyl-N-maleimidomethylammonium acetate), copoly(p-nitrostyrene-N,N-dimethyl-N-naphthyl-methyl-N-maleimidomethylammonium methanesulfonate), copoly(p-nitrostyrene-N,N-dimethyl-N-naphthyl-methyl-N-maleimidomethylammonium chloride), copoly[o-methylstyrene-N,N-dibutyl-N-(4-biphenyl-methyl)-N-(3-maleimidopropyl)ammonium acetate], copoly[o-methylstyrene-N,N-dibutyl-N-(4-biphenyl-methyl)-N-(3-maleimidopropyl)ammonium bromide], copoly[o-methylstyrene-N,N-dibutyl-N-(4-biphenyl-methyl)-N-(3-maleimidopropyl)ammonium iodide], copoly[o-methylstyrene-N,N-dibutyl-N-(4-biphenyl-methyl)-N-(3-maleimidopropyl)ammonium p-toluene-sulfonate], copoly[o-methylstyrene-N,N-dibutyl-N-(4-biphenyl-methyl)-N-(3-maleimidopropyl)ammonium methane-sulfonate], copoly[o-methylstyrene-N,N-dibutyl-N-(4-biphenyl-methyl)-N-(3-maleimidopropyl)ammonium chloride], copoly[2,4-dichlorostyrene-N,N-dimethyl-N-phenethyl-N-(4-acrylamidobutyl)ammonium iodide], copoly[2,4-dichlorostyrene-N,N-dimethyl-N-phenethyl-N-(4-acrylamidobutyl)ammonium bromide], copoly[2,4-dichlorostyrene-N,N-dimethyl-N-phenethyl-N-(4-acrylamidobutyl)ammonium acetate], copoly[2,4-dichlorostyrene-N,N-dimethyl-N-phenethyl-N-(4-acrylamidobutyl)ammonium methanesulfonate], copoly[4-methylstyrene-N,N-dimethyl-N-phenethyl-N-(4-acrylamidobutyl)ammonium chloride], copoly[4-methylstyrene-N,N-diethyl-N-(3,5-diethyl-benzyl)-N-(2-methacrylamidoethyl)ammonium chloride], copoly[styrene-N,N-dimethyl-N-(2-acrylamidoethyl)-N-(4-nitrophenyl)ammonium chloride], copoly[4-cyanostyrene-N,N-dimethyl-N-(4-chlorobenzyl)-N-(2-acrylamidoethyl)ammonium chloride], copoly[4-chlorostyrene-N,N-dibenzyl-N-(2-acrylamido-ethyl)-N-(4-t-butylbenzyl)ammonium chloride], copoly[benzylacrylate-N,N-dimethyl-N-naphthyl-methyl-N-(3-maleimidopropyl)ammonium chloride], copoly[phenylacrylate-N,N-diethyl-N-(4-ethylbenzyl)-N-(3-methacrylamidopropyl)ammonium bromide], copoly[2-methylstyrene-N,N-dimethyl-N-(4-phenylbenzyl)-N-(2-methacrylamidoethyl)ammonium bromide], copoly[styrene-N-(4-maleimidophenyl)-N,N,N-trimethyl-ammonium p-toluenesulfonate], copoly[styrene-N-benzyl-N,N-diethyl-N-(4-maleimido-phenyl)ammonium methosulfate], copoly[4-nitrostyrene-N-(4-maleimidobenzyl)-N,N,N-triethylammonium bromide], copoly[styrene-N-benzyl-N,N-dimethyl-N-(4-maleimido-benzyl)ammonium methosulfate], copoly[styrene-N-(4-maleimidomethylbenzyl)-N,N,N-tri-methylammonium p-toluenesulfonate], copoly[styrene-N-benzyl-N,N-dimethyl-N-(4-maleimido-methylbenzyl)ammonium chloride], copoly[styrene-N-benzyl-N-carbamoylmethyl-N-(3-maleimidopropyl)-N-methylammonium chloride], copoly[2-methyl-5-vinylpyridine-1-benzyl-2-methyl-5-vinylpyridinium chloride], copoly[styrene-N-benzyl-N-ethoxycarbonylmethyl-N-(3-maleimidopropyl)-N-methylammonium chloride], copoly[styrene-N-benzyl-N-cyanomethyl-N-(3-maleimido-propyl)-N-methylammonium chloride].

The crosslinking agent which is either mixed with the polymer or coated onto a layer containing the polymer is a bisalkane or bisarene sulfonate having the formula:

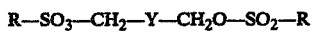

wherein R is a lower alkyl group containing from 1 to 6 carbon atoms such as methyl, ethyl, propyl, butyl, pentyl, hexyl and the like, or aryl such as phenyl, tolyl, naphthyl, p-chlorophenyl and the like; Y is an unsaturated divalent radical such as arylene or substituted arylene such as phenylene, naphthylene, or the like; unsaturated alkylene such as vinylene and ethynylene, and the like; heterylene such as pyridinediyl, furandiyl and the like.

It is understood that the terms alkyl and aryl as used herein include substituted alkyl and substituted aryl, such as chloroethyl, phenylbutyl, and the like.

The crosslinking agents of this invention may be formed by reacting an unsaturated diol such as 1,4-butynediol with an alkane sulfonyl chloride such as methanesulfonyl chloride in solvents such as acetonitrile, tetrahydrofuran, chloroform, dichloromethane, 2,6-lutadine and the like. The reaction may be carried out at any temperature, but it is preferred to react the components at a temperature of from −10° C. to 25° C. The molar ratio of diol to sulfonyl halides are from about 1:2 to about 1:4. The general methods of preparing the crosslinking agents of this invention are reported in R. K. Crosland and K. L. Servis, *J. Org. Chem.*, 35, 3196 (1970) and Eglinton and Whiting, *J. Chem. Soc.*, 3650 (1950).

Some examples of bissulfonates useful herein are 1,4-butynediol dimesylate, p-xylene-α,α'-diol dimesylate, cis-1,4-butenediol dimesylate, pyridine-2,6-dimethanol dimesylate, 1,4-butynediol ditosylate, furan-2,6-dimethanol bis(benzenesulfonate), and the like.

The dye mordant composition comprises from about 0.1 to about 20 weight percent bissulfonate crosslinking agent based on the total weight of bissulfonate and mordant polymer. In this respect, the polymer should be at least 0.25% unquaternized and preferably from about 0.25% to about 20% unquaternized on a molar basis.

Mordanting amounts of the novel crosslinked polymers of the invention can be employed as such from an aqueous or methanolic medium, or can be incorporated in water-permeable hydrophilic organic colloids or other polymeric binder materials. The resulting mixture can be used in the preparation of dye imbibition printing blanks, receiving layers for color transfer processes, such as those described in Land U.S. Pat. No. 3,362,819, Rogers U.S. Pat. No. 2,983,606, Whitmore U.S. Pat. Nos. 3,227,552 and 3,227,550, and in antihalation layers such as those described in Jones et al U.S. Pat. Nos. 3,282,699. Satisfactory binders used for this purpose include any of the hydrophobic binders generally employed in the photographic field including, for example, poly(vinyl acetate), cellulose acetate butyrate, poly(vinyl alcohol), and the like. Exemplary materials are disclosed in *Product Licensing Index*, Volume 92, December, 1971, publication 9232, page 108. In general, a mordanting amount of polymer can be employed in a dye mordanting or dye image-receiving layer. A binder can be used along with the polymeric mordant in the layer. The amount of dye mordant to be used depends on the amount of dye to be mordanted, the mordanted polymers, the imaging chemistry involved, etc, and can be determined easily by one skilled in this art. It is preferred that between 20 and 80% by weight of polymer be used in the dye mordanting layers.

The dye image-receiving element can comprise a support having thereon a layer including the mordant composition of this invention. The element may also comprise other layers, such as a polymeric acid layer, and can also include a timing layer as taught in U.S. Pat. No. 3,362,819, or a light reflective interlayer comprising a light reflective white pigment such as $TiO_2$ and a polymeric binder, in accordance with the teaching of Beavers and Bush U.S. Pat. No. 3,445,228.

Supports may be coated using any conventional coating procedure, such as dip-coating, roll-coating, and the like. Various methods of coating are described in *Product Licensing Index*, Volume 92, December, 1971, publication 9232, page 109.

Any support typically used for photographic elements may be coated, such as paper, plastic, polyester, such as poly(ethylene terephthalate) and the like. Various supports are listed in *Product Licensing Index*, Volume 92, December, 1971, publication 9232, page 108.

The mordanting compositions of this invention are also especially useful in light-filtering layers, such as in antihalation layers of the type disclosed in Jones and Milton U.S. Pat. No. 3,282,699. Here, the light-filtering layer preferably can comprise a hydrophilic colloid and the mordanting composition of this invention. The layer is adapted to contain a dye held or fixed by the mordanting composition.

In addition, the novel mordants of this invention can also be employed in integral negative-receiver photographic elements, such as those described in U.S. application Ser. No. 27,990 by Cole, filed Apr. 13, 1970, U.S. application Ser. No. 27,991 of Barr et al, filed Apr. 13, 1970 and U.S. Pat. No. 3,415,644, issued Dec. 10, 1968. In general, these integral photographic elements comprise a support having thereon a layer containing one or more of the novel mordants described herein and at least one photosensitive silver halide emulsion layer, the silver halide of which has contiguous thereto a dye image-providing material.

When a water-permeable colloid is used, the quantity of mordant employed can be varied, depending upon the particular mordant and its chemical characteristics, as well as the dyes to be fixed in the mordanting layer. In general, the quantity of mordant should be at least 10% by weight, based on the weight of hydrophilic colloid. Larger amounts of mordant can be employed in the hydrophilic colloid layers and amounts as high as 50% by weight, based on the weight of the hydrophilic colloid, give quite useful results.

The mordants can also be used for fixing the dyes, and particularly acid dyes, used in the preparation of photographic filter, antihalation and gelatino-silver-halide emulsion layers. Such layers can be coated on conventional photographic supports, such as flexible sheet supports (e.g., cellulose acetate, polyester films, polyvinyl resins, etc), or paper, glass, etc.

More than one of the mordanting polymers of this invention can be used together, in a single layer or in two or more layers. The mordanting polymers of this invention can also be used in admixture with other mordants in the same layer or in separate layers of the same element.

Whether the polymers be employed in a single layer or in two layers, it is preferred that the total coverage of the mordanting layer or layers be from 5 to 55 mg/dm$^2$ in order to satisfactorily act as a mordant.

The layers containing the crosslinked polymers of this invention can be prepared from not only aqueous systems, but also methanol or alkaline compatible systems as well.

Emulsions or compositions containing the interpolymers can be chemically sensitized with compounds of the sulfur group and/or noble metal salts (such as gold salts), reduction sensitized with reducing agents, or any combination of these. Furthermore, emulsion layers and other layers present in photographic elements made according to this invention can be hardened with any suitable hardener such as aldehyde hardeners, aziridine hardeners, hardeners which are derivatives of dioxane, oxypolysaccharides such as oxystarch, oxy plant gums, and the like. The emulsion can also contain additional additives, particularly those known to be beneficial in photographic emulsions, including for example, stabilizers or antifoggants, particularly the water-soluble inorganic acid salts of cadmium, cobalt, manganese and zinc as disclosed in U.S. Pat. No. 2,829,404, the substituted triazindolizines as disclosed in U.S. Pat. Nos. 2,444,605 and 2,444,607, speed increasing materials, plasticizers and the like. Examples of these additives are found in *Product Licensing Index*, Volume 92, December, 1971, publication 9232, pages 107-110.

Mordanted blanks treated in accordance with this invention are useful for receiving acid dyes from hydrophobic colloid relief images according to prior art techniques. Typical acid dyestuffs which can be transferred to the treated blanks of the invention are Anthracene Yellow GR (400% pure Schultz No. 177), Fast Red S Conc. (Colour Index 176), Pontacyl Green SN Ex. (Colour Index737), Acid blue black (Colour Index 246), Acid Magenta O (Colour Index 692), Naphthol Green B Conc. (Colour Index 5), Brilliant Paper Yellow Ex. Conc. 125% (Colour Index 364), Tartrazine (Colour Index 640), Metanil Yellow Conc. (Colour Index 138), Pontacyl Carmine 6B Ex. Conc. (Colour Index 57), Pontacyl Scarlet R. Conc. (Colour Index 487) and Pontacyl Rubine R Ex. Conc. (Colour Index 179).

This invention is further illustrated by the following examples.

EXAMPLE 1

To a solution of 66 g. of 2-butyne-1,4-diol and 300 ml. of 2,6-lutidine in 600 ml. of acetonitrile was added 160 ml. of methanesulfonyl chloride at less than 10° C. After 1 hour, the mixture was poured into ice water, and the solid was isolated and recrystallized from benzene and 2-butanone to produce a yield of 102 g. of 1,4-butynediol dimesylate having a melting point of 84° to 85.5° C.

A two-layer coating was prepared having the following structure, the numbers in parenthesis indicating the coverage in mg/dm$^2$. The layers were extrusion coated.

| | |
|---|---|
| Layer 2: | Titanium dioxide (86), zinc oxide (6.5), dimesylate hardener (1.3) and polymeric mordant[1] (26) |
| Layer 1: | Partially hydrolyzed low molecular weight poly-(methylvinyl ether-co-maleic anhydride) (220), dibutyl maleate (108), and a polyurethane elastomer (estane 5711 manufactured by B. F. Goodrich Co.) (75) Polyester Film Support |

[1]poly[styrene-co-1-(3-dimethylaminopropylmaleimide)-co-N-benzyl-N,N-dimethyl-N-(3-maleimidopropyl)ammonium chloride] prepared by quaternization of poly[styrene-co-N-(3-dimethylaminopropyl)-maleimide] with benzyl chloride, as described in U. S. Patent 3,709,690. The polymer was quaternized to the extent of 80.5 mole percent of the available amine and contained 50 mole percent styrene.

The crosslinking agent was incorporated with the polymer-pigment dispersion approximately 5 minutes before coating and crosslinking was carried out at temperatures of from 70° F. to 100° F.

The hardness of the mordant-pigment layer was measured by washing the coatings with water at 22° C. and testing the coating to determine if the crosslinked structure was damaged. In the above case, the coating was tested 5 hours after coating and did not wash off even after vigorous rubbing.

The above mordanted element was compared to the same element wherein 1,4-butanediol diglycidyl ether (commercially available as Araldite RD-2, a trademark of Ciba Company), which is a commercially available hardener, was substituted as a crosslinking agent. The diglycidyl ether was used at a level of 0.27 mg/dm$^2$ which is more than 3 times in excess of the amount used of the hardener of the present invention. The coating washed off readily when subjected to the hardness test.

EXAMPLE 2

The elements of Example 1 containing various levels of Araldite hardener were tested for hardness at different degrees of quaternization of the mordant polymer 5 hours after the coatings were prepared. The results are shown in Table I.

Table I

| | Hardness of Mordant-Pigment Layer as Measured by Washing | | | | | |
|---|---|---|---|---|---|---|
| % Quaternization of Mordant Polymer | Araldite Level (mg/dm$^2$) | | | Dimesylate Hardner Level (mg/dm$^2$) | | |
| | 0.27 | 1.1 | 4.3 | 0.08 | 0.32 | 1.3 |
| 94.8 | W | W | W | W | SW | NW |
| 91.6 | W | W | W | SW | NW | NW |
| 87.0 | W | W | W | NW | NW | NW |

Table I-continued

Hardness of Mordant-Pigment Layer as Measured by Washing

| % Quaternization of Mordant Polymer | Araldite Level (mg/dm²) | | | Dimesylate Hardner Level (mg/dm²) | | |
|---|---|---|---|---|---|---|
| | 0.27 | 1.1 | 4.3 | 0.08 | 0.32 | 1.3 |
| 80.5 | W | W | SW | NW | NW | NW |

W = Washes off readily
SW = Has some crosslinked structure but washes off with rubbing
NW = Will not wash off with vigorous rubbing The above indicates the improved hardening due to the dimesylate of the invention even at levels less than ⅓ of the conventional hardener.

EXAMPLE 3

A series of receiving elements for a color development diffusion transfer system were prepared having the following structure and the coverage in mg/dm² indicated in parenthesis:

| | |
|---|---|
| Layer 4 | Gum arabic (2.2) |
| Layer 3 | Gelatin (32) and the polymeric mordant of Example 1 (5.4) |
| Layer 2 | Titanium dioxide (86), zinc oxide (6.5), hardener (varied) and polymeric mordant¹ (26) |
| Layer 1 | Partially hydrolyzed low molecular weight poly(methyl-vinyl ether-co-maleic anhydride) (220) dibutyl maleate (108), and a polyurethane elastomer (Estane 5711, manufactured by B. F. Goodrich Co.) (75) |
| | Support |

Layer 3 was coated over layer 2 after 4 days aging at room temperature. The epoxide (Araldite) hardener described in Example 2 and dimesylate described in Example 2 were coated in layer 2 with the polymer at each of 94.8, 91.6 and 80.5 mole percent degrees of quaternization.

A multicolor photographic element of the type described in Example 9 of copending Thomas et al U.S. application Ser. No. 204,340, filed Dec. 2, 1971 now abandoned was exposed to a multicolor test object. A processing composition comprised 40 g. potassium hydroxide, 40 g. 4-amino-N-ethyl-N-β-hydroxyethylaniline, 0.2 g. piperidino hexose reductone, 0.05 g. 5-methylbenzimidazole, 0.01 g. 1-phenyl-2-tetrazoline-5-thione and 22 g. hydroxyethylcellulose was spread from a pod between the exposed surface of the image-forming element and the superposed receiving element.

After 60 seconds at 24° C., each dye-image receiving element was peeled apart from the negative.

The maximum densities ($D_{max}$) of the transferred dyes as measured both on freshly coated receivers and the corresponding receivers incubated for 14 days at 25° C. and 42% relative humidity are shown in Table II for the optimum levels of the hardeners which were 4.3 mg/dm² for the epoxide and 0.32 mg/dm² for the dimesylate hardener.

Table II

Effect of Hardners on $D_{MAX}$

| Receiver Tested | % Quaternization of the Polymer | Bisepoxide Hardner $D_{MAX}$ | | | Dimesylate Hardner $D_{MAX}$ | | |
|---|---|---|---|---|---|---|---|
| | | Red | Green | Blue | Red | Green | Blue |
| Fresh | 94.8 | 1.72 | 1.76 | 1.79 | 1.92 | 1.92 | 1.87 |
| Fresh | 91.6 | 1.72 | 1.79 | 1.74 | 2.00 | 2.00 | 2.03 |
| Fresh | 80.5 | 1.90 | 2.04 | 1.83 | 1.82 | 1.88 | 1.84 |
| Incubated | 94.8 | 1.76 | 1.77 | 1.79 | 2.04 | 2.12 | 1.91 |
| Incubated | 91.6 | 1.84 | 1.86 | 1.76 | 2.00 | 2.14 | 1.91 |
| Incubated | 80.5 | 1.95 | 2.08 | 1.87 | 1.92 | 2.07 | 1.86 |

It is seen that the use of the dimesylate crosslinker of the present invention gave substantially higher $D_{max}$ than did the bisepoxide hardener, especially at the highest levels of quaternization of the polymer. No significant difference between the hardeners was discerned with regard to sunlight stain. The level required of the dimesylate hardener was less than 1/10 the level required of the bisepoxide.

EXAMPLE 4

A reactor was charged with a solution of 34.5 g. of p-xylene-α,α'-diol and 66 g. of N,N-diisopropylethylamine in 400 ml. of tetrahydrofuran. To the solution was added, at less than 10° C., 58.5 g. of methanesulfonyl chloride. After adding 150 ml. benzene, the mixture was stirred for an additional half-hour and filtered. The final product was 56 g. of p-xylene-α,α'-diol dimesylate having a melting point of 102°–104° C.

The above crosslinker was substituted for the hardener in layer 2 of Example 2 at levels of 0.32 and 1.3 mg/dm² with a 91.8% mole quaternized polymer. The coatings did not wash off after washing with water 5 hours after the coating step.

EXAMPLE 5

The test of Example 4 was repeated for an element containing cis-2-butene-1,4-diol dimesylate at levels of 0.32 and 1.3 mg/dm² with a 91.8% quaternized polymer. The coatings did not wash off after washing with water at 22° C. 5 hours after the coating step.

EXAMPLE 6

The test of Example 4 was repeated for an element containing pyridine-2,6-dimethanol dimesylate at levels of 0.32 and 1.3 mg/dm² with a 91.8% quaternized polymer. The coatings did not wash off after washing with water at 22° C. 5 hours after the coating step.

EXAMPLE 7

A series of receiving elements for color diffusion transfer were prepared as in Example 3 using the hardeners of Examples 1, 4, 5 and 6. The coatings were processed as in Example 3 with the same negative element and pod. The polymer used was quaternized to the extent of 91.8 mole percent. The results of the sensitometric tests are shown in Table III.

Table III

Sensitometric Comparison of Dimesylate Hardeners

| Hardener | Amount of Hardener mg/dm² | $D_{max}$ Fresh | | | $D_{max}$ 2-Week Incubation | | |
|---|---|---|---|---|---|---|---|
| | | Red | Green | Blue | Red | Green | Blue |
| Example 1 | 0.32 | 1.97 | 2.15 | 1.91 | 1.90 | 2.06 | 1.88 |
| Example 1 | 1.3 | 1.98 | 2.15 | 1.90 | 1.89 | 2.04 | 1.83 |
| Example 4 | 0.32 | 1.85 | 2.07 | 1.86 | 1.83 | 1.98 | 1.83 |
| Example 4 | 1.3 | 1.92 | 2.10 | 1.90 | 1.90 | 2.04 | 1.82 |
| Example 5 | 0.32 | 1.97 | 2.18 | 1.92 | 1.90 | 2.02 | 1.77 |

Table III-continued

| Sensitometric Comparison of Dimesylate Hardeners | | | | | | | |
|---|---|---|---|---|---|---|---|
| | Amount of Hardener | $D_{max}$ Fresh | | | $D_{max}$ 2-Week Incubation | | |
| Hardener | mg/dm² | Red | Green | Blue | Red | Green | Blue |
| Example 5 | 1.3 | 1.97 | 2.15 | 1.92 | 1.89 | 2/04 | 1.85 |
| Example 6 | 0.32 | 1.94 | 2.14 | 1.95 | 1.88 | 2.03 | 1.84 |
| Example 6 | 1.3 | 2.02 | 2.20 | 1.95 | 1.94 | 2.07 | 1.91 |

EXAMPLE 8

This is a comparative example.

Two-layer coatings having the structure described in Example 1 were prepared substituting the following hardeners for the dimesylate of Example 1.

(a) 1,3-bis(2-chloroethyl)urea
(b) bis(2-chloroethylsulfonyl)methane
(c) N,N'-bis(chloroacetyl)hydrazine
(d) 1,5-bis(mesyloxy)-3-oxapentane
(e) 1,5-bis(mesyloxy)-3-methylpentane
(f) bis(2-mesyloxyethylsulfonylmethyl)ether
(g) 2,2'-sulfonyldiethyl ditosylate
(h) 1,3,5-tris(bromoacetyl)hexahydro-s-triazine
(i) 1,4-bis(chloroacetyl)piperazine In all cases the coatings washed off readily when subjected to the water wash.

The invention has been described in detail with particular reference to certain preferred embodiments thereof, but it will be understood that variations and modifications can be effected within the spirit and scope of the invention.

We claim:

1. A dye mordant composition comprising the reaction product of from 0.1 to 20 weight percent based on the total weight of (a) and (b) of:

(a) a bisalkane or bisarene sulfonate, vinyl polymer crosslinking agent having the formula:

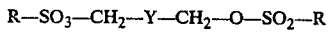

$$R-SO_3-CH_2-Y-CH_2-O-SO_2-R$$

wherein R is alkyl or aryl and Y is selected from the group consisting of unsaturated alkylene, arylene, pyridine diyl and furan diyl;

and from about 80 to 99.9 weight percent based on the total weight of (a) and (b) of (b) a cross-linkable resinous vinyl polymer comprised of first repeating units and second repeating units, said first repeating units comprising at least one-third of said vinyl polymer and said second repeating units being from ethylenically unsaturated monomers and comprising from 0 to 66.67 weight percent of said polymer and said first repeating units being represented by the formula:

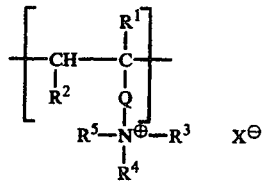

wherein $R^1$ is hydrogen or alkyl and Q is selected from the group consisting of the atoms which when taken together with $R^2$ form a

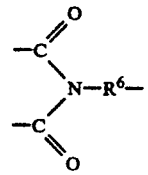

group, wherein $R^2$ is an alkylene radical, $R^3$, $R^4$ and $R^5$ are alkyl, aryl or aralkyl groups and those atoms which when taken together with $R^3$ and $R^4$ are the nitrogen atom to which they are attached form a quaternized nitrogen-containing heterocyclic ring, $R^6$ is alkylene, and $X^\ominus$ is an anion, said polymer being substantially free of carboxyl groups.

2. The dye mordant composition of claim 1 wherein said first repeating units of said vinyl polymer comprise at least two aryl groups for each quaternary nitrogen atom.

3. The dye mordant composition of claim 1 wherein the polymer also comprises units of styrene.

4. The dye mordant composition of claim 3 wherein one of $R^3$, $R^4$ or $R^5$ is a group comprising at least one aryl group.

5. The dye mordant composition of claim 1 wherein said polymer is poly(styrene-co-N-butyl-N,N-dimethyl-N-(3-maleimidopropyl)ammonium chloride).

6. The dye mordant composition of claim 1 wherein the crosslinking agent is 1,4-butynediol dimesylate.

7. The dye mordant composition of claim 1 wherein the crosslinking agent is p-xylylene-α,α'-diol dimesylate.

8. The dye mordant composition of claim 1 wherein the crosslinking agent is cis-2-butene-1,4-diol dimesylate.

9. The dye mordant composition of claim 1 wherein the crosslinking agent is pyridine-2,6-dimethanol dimesylate.

10. The dye mordant composition of claim 1 wherein the crosslinking agent is 1,4-butynediol ditosylate.

11. The composition of claim 1 wherein the polymer is from 80% to about 99.75% quaternized.

12. The composition of claim 1 wherein Y is selected from the group consisting of ethylenically unsaturated alkylene, arylene, pyridinediyl and furandiyl.

13. A dye mordant composition comprising the reaction product of crosslinkable resinous poly[styrene-co-N-benzyl-N,N-dimethyl-N-(3-maleimidopropyl)ammonium chloride] and 1,4-butenediol dimesylate comprising from 0.1 to 20 weight percent of 1,4-butenediol dimesylate and from 80 to 99.9 weight percent of poly[styrene-co-N-benzyl-N,N-dimethyl-N-(3-maleimidopropyl)-ammonium chloride] based on the total weight of polymer and dimesylate.

* * * * *

UNITED STATES PATENT AND TRADEMARK OFFICE
CERTIFICATE OF CORRECTION

PATENT NO. : 4,128,538
DATED : December 5, 1978
INVENTOR(S) : Donald M. Burness, Hans G. Ling and Glen M. Dappen It is certified that error appears in the above-identified patent and that said Letters Patent are hereby corrected as shown below:

In the title page, item [75], "Arnold" should be -- Donald --.
In the title page, item [75], "Doppen" should be -- Dappen --.
Column 4, line 25, "can" should be deleted.
Column 12, line 63, "Hardner" should be -- Hardener --.
Column 13, line 5, "Hardner" should be -- Hardener --; line 31, after the layer formation, insert --$^1$The polymeric mordant of Example 1. --; line 59, "Hardners" should be -- Hardeners --; line 61, "Hardner" should be -- Hardener -- (both occurrences).
Column 14, line 2, "Hardners" should be -- Hardeners --; line 4, "Hardner" should be -- Hardener -- (both occurrences).
Column 15, line 8, "2/04" should be -- 2.04 --.
Column 16, line 24, "are the" should be -- and the --.

Signed and Sealed this

Fifth Day of June 1979

[SEAL]

Attest:

RUTH C. MASON
Attesting Officer

DONALD W. BANNER
Commissioner of Patents and Trademarks